Patented Feb. 29, 1944

2,343,108

UNITED STATES PATENT OFFICE 2,343,108

PRODUCTION OF BUTADIENE

Oliver W. Cass, Niagara Falls, N. Y., assignor to E. I. du Pont de Nemours & Company, Wilmington, Del., a corporation of Delaware No Drawing. Application August 21, 1940, Serial No. 353,543

1 Claim. (Cl. 260—680)

This invention relates to the production of butadiene from butane or butylene. An object of this invention is to provide an improved method for producing butadiene from a process which involves pyrolysis of a dihalobutane. Another object is to carry out such process while avoiding the production of halogenated by-products and in such manner as to avoid loss of halogen. Other objects will be apparent from the following description of the invention.

In accordance with the present invention dibrombutane is prepared by bromination of butylene. The dibrombutane then is heated to a suitable cracking temperature which results in the formation of a gaseous mixture of butadiene and hydrogen bromide. The hydrogen bromide is separated from this mixture by any suitable known means, for example, by fractional distillation at temperatures below the boiling point of butadiene. The hydrogen bromide vapor thus recovered is oxidized by reaction with oxygen, preferably in the presence of a suitable oxidation catalyst, to convert the hydrogen bromide to bromine. The product from the oxidation reaction consists of bromine and water vapors; it may also contain more or less of non-oxidized hydrogen bromide vapor, depending upon the efficiency of the oxidation process. On condensation of these vapors the liquid bromine and water separate into two layers. To these layers is added sufficient chlorine to convert all the unoxidized hydrogen bromide to bromine, and the combined layers are then utilized to brominate a further quantity of butylene and the cycle is repeated. The entire process may be carried out continuously to produce butadiene in excellent yields and with substantially no loss of bromine.

In a preferred method of operating this process, butane is subjected to pyrolysis to produce a gaseous mixture of butylene and hydrogen, together with some unreacted butane. This mixture is passed into contact with a liquid bromine and water mixture. For example, the pyrolysis gases may be passed upwardly through a scrubbing tower counter-current to a downward flow of the liquid bromine and water mixture. All of the butylene from the gas mixture reacts with the bromine to form dibrombutane, so that a mixture of dibrombutane and water collects at the bottom of the tower or reaction vessel. This reaction is carried out at a relatively low temperature and in the absence of light, for example at a maximum temperature of 50° C., preferably at 20–30° C. Under these conditions the butane and the hydrogen in the pyrolysis gases do not react with the bromine. From this unreacted gaseous residue the hydrogen is separated from the butane by low temperature distillation and the butane is re-cycled to the pyrolysis operation.

The dibrombutane obtained by the above procedure is first treated to remove the water present and then is subjected to pyrolysis at a temperature of 350 to 600° C., preferably between 450 and 500° C., which causes it to decompose to form butadiene and hydrogen bromide. The off-gases from the pyrolysis are cooled to a temperature below the boiling point of butadiene, and rectified to separate the hydrogen bromide from the butadiene. The hydrogen bromide then is mixed with sufficient air or oxygen to oxidize it to water and bromine. The hydrogen bromide-air mixture is passed over a copper catalyst at a temperature of 200–400° C., preferably around 300° C., to produce a gaseous mixture of bromine and water vapor, which may contain, e. g., up to 5% by volume of unreacted hydrogen bromide. The vapors from the oxidation reaction are condensed at a temperature below the boiling point of bromine, to produce liquid condensate which separates to form a layer of liquid bromine and a supernatant water layer. Hydrogen bromide present will be dissolved in the water layer. The condensation temperature preferably is about 10 to 20° C. Sufficient chlorine is added to the water layer to react with any hydrogen bromide present to form bromine and hydrogen chloride. Without further treatment, the liquid bromine-water mixture is recycled to react with the butylene as described above.

The reactions occurring in this process may be represented:

(1) $C_4H_{10} \rightarrow C_4H_8 + H_2$ (pyrolysis)
(2) $C_4H_8 + Br_2 \rightarrow C_4H_8Br_2$
(3) $C_4H_8Br_2 \rightarrow C_4H_6 + 2HBr$ (pyrolysis)
(4) $2HBr + \frac{1}{2}O_2 \rightarrow Br_2 + H_2O$ In the pyrolysis to convert dibrombutane to butadiene, the crude butadiene may contain some unconverted dibrombutane and some monobrombutylene. Any unconverted dibrombutane and monobrombutylene in the crude butadiene may be readily separated by fractionation. These by-products when separated then may be recycled to the pyrolysis step, whereby the dibrombutane and monobrombutylene are converted to butadiene. There may also be formed in the pyrolysis some small amount of high boiling residues containing bromine. From these residues the bromine may be recovered and recycled by feeding the residues into a gas or oil flame, and scrubbing the gases from this flame with water to absorb the hydrogen bromide produced. From this wash water, bromine may be recovered by treatment with chlorine, and recycled.

By the herein-described invention it is possible to obtain butadiene of high purity and in excellent yields. By oxidizing the hydrogen bromide and recycling the bromine thus formed, there is no substantial loss of bromine.

I claim:

A cyclic process for making butadiene which comprises subjecting normal butane to pyrolysis to produce a gaseous mixture of butylene, hydrogen and unchanged butane, passing said gaseous mixture counter-current to a descending stream of a mixed condensate consisting of liquid bromine and water at a temperature not exceeding about 50° C. to convert the butylene to dibrombutane; collecting the resulting unreacted mixture of butane and hydrogen, separating hydrogen therefrom and recycling the residual butane to the aforesaid pyrolysis; heating the dibrombutane to a temperature of 450 to 500° C. to produce a mixture of butadiene and hydrogen bromide; separating the hydrogen bromide and reacting it with oxygen at a temperature of 200 to 400° C. in the presence of a copper catalyst to produce mixed vapors of elemental bromine and water; condensing said mixed vapors to produce liquid bromine and water in separate layers, adding chlorine to the water layer to convert any hydrogen bromide present to bromine and hydrogen chloride; and then reacting a mixture of said liquid bromine and water layers with the products of butane pyrolysis, as aforesaid.

OLIVER W. CASS.